(12) United States Patent
Li et al.

(10) Patent No.: US 11,225,054 B2
(45) Date of Patent: Jan. 18, 2022

(54) METHOD AND APPARATUS FOR PRODUCING FILM-COATED METAL PLATE

(71) Applicant: BAOSHAN IRON & STEEL CO., LTD., Shanghai (CN)

(72) Inventors: Peng Li, Shanghai (CN); Hongxing Chen, Shanghai (CN); Zhangwei Wang, Shanghai (CN); Hua Ni, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 284 days.

(21) Appl. No.: 16/311,942

(22) PCT Filed: Jun. 23, 2017

(86) PCT No.: PCT/CN2017/089720
§ 371 (c)(1),
(2) Date: Dec. 20, 2018

(87) PCT Pub. No.: WO2018/001179
PCT Pub. Date: Jan. 4, 2018

(65) Prior Publication Data
US 2019/0210326 A1    Jul. 11, 2019

(30) Foreign Application Priority Data
Jun. 28, 2016   (CN) .......................... 201610487979.9

(51) Int. Cl.
*B32B 37/10* (2006.01)
*B32B 37/06* (2006.01)
(Continued)

(52) U.S. Cl.
CPC .............. *B32B 15/09* (2013.01); *B32B 27/08* (2013.01); *B32B 27/36* (2013.01); *B32B 37/06* (2013.01);
(Continued)

(58) Field of Classification Search
CPC ....... B32B 15/09; B32B 37/10; B32B 37/206; B32B 37/085; B32B 38/0036;
(Continued)

(56) References Cited

U.S. PATENT DOCUMENTS 3,762,598 A * 10/1973 Gayner .................. B21D 51/44
                                                    220/273
4,517,255 A *  5/1985 Kanda .................... B32B 15/08
                                                    428/626
(Continued)

FOREIGN PATENT DOCUMENTS

CN    1033255 A    6/1989
CN    1168651 A    12/1997
(Continued)

OTHER PUBLICATIONS

International Search Report and Written Opinion dated Sep. 27, 2017.
(Continued)

*Primary Examiner* — Cynthia L Schaller
(74) *Attorney, Agent, or Firm* — Lei Fang; Smith Tempel Blaha LLC

(57) ABSTRACT

Provided is a method for producing a film-coated metal plate, comprising the steps of: (1) pre-heating and soaking a metal plate; (2) laminating a film on the metal plate, with a deflector roller configured to be movable in a horizontal direction to adjust an angle α between the metal plate and a vertical direction; (3) cooling the metal plate; (4) compressing the metal plate to dry it; (5) reheating and post-processing the metal plate. A device for producing a film-coated metal plate is also provided, which comprises: an induction heating apparatus, a deflector roller (4) configured to be movable in a horizontal direction to adjust an angle α between the metal plate and a vertical direction, a thin film guide roller (6), a film-coating roller (7), a cooling apparatus
(Continued)

(9), a compressing and drying roller (12), a reheating apparatus (14) and an air cooling apparatus (15).

6 Claims, 2 Drawing Sheets

(51) Int. Cl.
*B32B 15/09* (2006.01)
*B32B 37/20* (2006.01)
*B32B 37/00* (2006.01)
*B32B 38/00* (2006.01)
*B32B 27/08* (2006.01)
*B32B 27/36* (2006.01)

(52) U.S. Cl.
CPC ............ *B32B 37/085* (2013.01); *B32B 37/10* (2013.01); *B32B 37/206* (2013.01); *B32B 38/0036* (2013.01); *B32B 2038/0056* (2013.01); *B32B 2309/06* (2013.01); *B32B 2367/00* (2013.01)

(58) Field of Classification Search
CPC ......... B32B 27/08; B32B 27/36; B32B 37/06; B32B 2038/0056; B32B 2309/06; B32B 2367/00; B32B 2307/714; B32B 27/06; B32B 15/20; B32B 2439/70; B32B 2250/02; B32B 2038/0048; B32B 2439/00

See application file for complete search history.

(56) References Cited

U.S. PATENT DOCUMENTS

| | | | | |
|---|---|---|---|---|
| 5,919,517 A * | 7/1999 | Levendusky | .......... | B05D 1/265 427/211 |
| 6,106,658 A * | 8/2000 | Kaguma | ................. | B32B 15/08 156/309.9 |
| 6,200,409 B1 * | 3/2001 | Tanaka | .................... | B32B 15/08 156/309.9 |
| 2001/0055690 A1 * | 12/2001 | Iwashita | ................. | B32B 15/09 428/458 |

FOREIGN PATENT DOCUMENTS

| | | |
|---|---|---|
| CN | 1201420 A | 12/1998 |
| CN | 102514302 | 6/2012 |
| CN | 102514342 | 6/2012 |
| CN | 202337044 | 7/2012 |
| CN | 103112233 | 5/2013 |
| CN | 203172121 | 9/2013 |
| CN | 203780000 U | 8/2014 |
| CN | 204547267 U | 8/2015 |
| EP | 0312302 A1 | 4/1989 |
| EP | 0312303 A1 | 4/1989 |
| EP | 0312304 | 4/1989 |
| WO | 9617721 A1 | 6/1996 |

OTHER PUBLICATIONS

Search Report dated Nov. 29, 2018 for Chinese Patent Application No. 2016104879799.
Office Action dated Apr. 26, 2021 for European Patent Application No. 17819176.

* cited by examiner

METHOD AND APPARATUS FOR PRODUCING FILM-COATED METAL PLATE

CROSS-REFERENCE TO RELATED APPLICATIONS

This application is a 371 U.S. National Phase of PCT International Application No. PCT/CN2017/089720 filed on Jun. 23, 2017, which claims benefit and priority to Chinese patent application no. 201610487979.9 filed on Jun. 28, 2016. Both of the above-referenced applications are incorporated by reference herein in their entireties.

TECHNICAL FIELD

The present disclosure relates to a method and a device for producing a metal plate, particularly to a method and a device for producing a film-laminated metal plate.

BACKGROUND ART

Metallic packaging materials (e.g. tin plates, chrome plates, etc) have the advantages of good barrier property, high strength, exquisite prints and the like, and can be used to package foods and drinks. Food or drink cans made of metallic packaging materials can realize a long shelf life without addition of any preservative, and can preserve the original quality and flavor of the foods or drinks to the largest extent.

Metallic packaging materials need to be used in conjunction with coatings to manufacture cans. For example, in a process of making a three-piece can, a resin coating is applied to a metal plate surface to form a film, and then the can is formed. In a process of making a two-piece can, stamping and shaping are carried out first, and then the resulting can body is coated by spraying or printing. In an operation of coating a metal plate, high-temperature baking needs to be performed several times. Hence, a large amount of energy is consumed, and a problem of solvent volatilization comes into being, which will cause certain environmental pollution. For example, existing methods for producing metal cans for packaging foods mainly involve coating a metal plate surface several times before forming a can or a lid. This kind of production methods entails use of a lot of organic solvent-containing coatings in the course of printing or coating metal plates. Thus, a large volume of the solvents will be volatilized when the coatings are baked to form films, and environmental pollution will be incurred easily. The coating process generally needs to be performed several times, and thus a great deal of energy will be consumed. Additionally, some types of coatings employ solvents comprising Biphenol A. After the coatings are dried, it's inevitable that a minor amount of Biphenol A will remain in film layers, thereby subjecting food safety to potential risk. Therefore, the environmental unfriendliness problem of traditional printing and coating in the abovementioned production becomes increasingly prominent as social development imposes more and more rigid requirements on environmental protection.

Polyester film (PET), which is non-toxic and odorless, and possesses good heat resistance, corrosion resistance and machinability, has already been widely used in the field of food and drink packaging. A combined use of polyester film and metallic material may take full advantages of these two materials. Generally, a polyester film is laminated intimately on a surface of a metal plate by hot melt lamination or gluing to form a film-laminated metal plate. The use of a film-laminated metal plate for manufacturing cans not only ensures the good properties of food or drink cans in use, but also omits a major part of the coating and baking procedure in the manufacture of cans by way of coating a metal plate. Thus, the production flow is shortened, the investment in energy and equipment is saved, and the production is more environmentally friendly. As a result, there is a potential to replace traditional coated metal plates with film-laminated metal plates.

A Chinese patent literature having a publication number of CN1168651, a publication date of Dec. 24, 1997 and a title of METHOD AND APPARATUS FOR PRODUCING LAMINATE BOARD discloses a method and an apparatus for laminating a thermoplastic resin film on a metal plate. According to this method, after a metal plate is heated, a thermoplastic resin film is laminated on at least one of the surfaces of the metal plate by pressing between a pair of laminate rolls. After the heated metal plate and the resin film are pressed and laminated in a vertical direction by passing through the laminate rolls, the laminate plate is pushed aside by a deflector roll in a transverse direction so as to bias the travelling direction towards one of the laminate rolls, such that the film-laminated metal plate forms a contacting angle with this laminate roll. Therefore, the thickness of the melted layer of the film in this direction can be adjusted. Because the cooling effect of the laminate rolls on the metal plate is notable, the temperature of the film-laminated metal plate decreases rapidly during contacting with the laminate rolls. If the lamination process continues after the film-laminated metal plate leaves the gap between the laminate rolls, the temperature of the film-laminated metal plate will continue to decrease quickly, and propagation of the melted layer will tend to stop shortly. Therefore, it's actually difficult for this method to achieve adjustment of the melted layer thickness in a wide range as stated therein.

Another Chinese patent literature having a publication number of CN102514342B, a publication date of Aug. 6, 2014 and a title of FILM LAMINATING APPARATUS AND FILM LAMINATING METHOD discloses a film laminating method and a film laminating apparatus for hot laminating a film on a metal plate, wherein a method for quenching a film-laminated metal plate is mentioned, wherein a quenching unit comprises an air cooling device and a water cooling tank arranged sequentially in a direction along which the film-laminated metal plate is conveyed. A cooling rate of 70-80° C./s can be achieved. For some packaging applications where property requirements are rigorous, metal plates need to be cooled to room temperature in a very short period of time after film lamination is finished. Restricted by the air cooling manner, generally, this patent can hardly achieve a higher cooling rate in a short period of time. Therefore, the product properties are restricted.

SUMMARY

One of the objects of the disclosure is to provide a method for producing a film-laminated metal plate. This method can be utilized to produce a metal plate with a film laminated on a surface thereof, and enables easy control of a thickness of a melt film layer in the production. At the same time, this method enables increase of a cooling rate so as to improve properties of the film-laminated metal plate. The film-laminated metal plate produced by this method can be used for food and drink packaging.

To fulfill the above object, the disclosure proposes a method for producing a film-laminated metal plate, comprising the following steps:

(1) preheating and soaking a metal plate, wherein, in general, said preheating is rapid heating achieved using an induction heater (generally used for steel plates), and a number of induction heating rolls (for example, 3-9) are used to achieve a target value of a metal plate temperature and carry out said soaking;

(2) hot film lamination: controlling an angle $\beta$ of 30-70° at which a film enters a roll gap between film-laminating rolls, wherein said angle $\beta$ is an angle between the film and a vertical direction; controlling an angle $\alpha$ of 0-20° between the metal plate and the vertical direction, wherein said angle $\alpha$ is achieved by means of a deflector roll; then heat-laminating the film on the metal plate using the film-laminating rolls, wherein a temperature of the film-laminating rolls is controlled at 50-130° C.;

(3) cooling: cooling a surface of a resulting film-laminated metal plate rapidly to a temperature equal to or less than 50° C. at first by water spray cooling, followed by water quenching in a water quenching tank;

(4) squeezing the film-laminated metal plate to remove most water from the surface of the film-laminated metal plate;

(5) reheating and post-treatment: heating the film-laminated metal plate to a temperature in the range of 50–130° C., holding for 5-40 s, and then air cooling the film-laminated metal plate to room temperature quickly.

The method for producing a film-laminated metal plate according to the disclosure produces a metal plate with a film laminated on a surface thereof by the above steps, wherein:

In step (1), a combined heating process is applied to the metal plate, which process comprises two parts: preheating and soaking. Thus, rapid heating of the metal plate can be realized, and temperature uniformity of the metal plate can be guaranteed. After heating, the temperature of the metal plate is generally higher than 220° C.

In step (2), the film is laminated on the metal plate using film-laminating rolls. Because of the heating in step (1), the temperature of the metal plate is generally higher than 220° C. Hence, the lamination is hot lamination. In the course of this hot lamination, a melt layer is generated in the film at a side in contact with the metal plate. A thickness of this melt layer can be controlled easily by setting a target temperature of the metal plate and/or the angle of the deflector roll in step (1), so as to control the properties of the film-laminated metal plate. The contact time of the metal plate and a film toward which the metal plate is deflected is controlled by controlling the angle $\alpha$ between the metal plate and the vertical direction (i.e. the deflection angle at which the metal plate enters the roll gap between the film-laminating rolls), so as to control a thickness of a melt layer of said film at this side (the melt layer thickness increases as the angle $\alpha$ and the contact time increase). However, a thickness of a melt layer of a film from which the metal plate is deviated is not affected. Therefore, the films at both sides of the metal plate are controlled to possess differentiated melt layer thicknesses, so that the properties of the surfaces of the film-laminated melt plate at these two sides are differentiated. This differentiation is suitable for applications having different requirements of surface properties at two sides, such as food cans which generally have different property requirements for inner and outer surfaces. In addition, the deflector roll can also act to stabilize the metal plate, thereby ensuring thickness uniformity of the melt layer of each film.

In this step, $\beta$ is chosen from the range of 30-70° for the following reason: before the film enters the roll gap between the film-laminating rolls at an angle in this range, full spread of the film can be guaranteed, so as to ensure that the film be laminated evenly on the metal plate surface; a is chosen from the range of 0-20° for the following reason: when the a angle is in this range, the melt layer thickness of the film will be in a most ideal range. If the angle is above this range, the film tends to be melted unduly due to an excessively long period of contact time between the film and the metal plate, thereby affecting the properties of the film-laminated metal plate.

In the production method according to the disclosure, in step (2), a temperature of the film-laminating rolls is controlled at 50-130° C. This temperature range is chosen for the following reason: when the temperature is in this range, a structure of the film can be controlled, so as to achieve the desired properties of corrosion resistance and processability.

In step (3), the melt layer is solidified by cooling, so as to bond the film to the metal plate. In this step, to provide the film-laminated metal plate with good properties in use, the film-laminated metal plate needs to be cooled very rapidly in a short period of time (preferably 0.5-5 s after the film-laminated metal plate exits the film-laminating rolls, as stated below). For this purpose, a cooling mode of water spray plus water quenching is employed. After cooled by water spray, the film-laminated metal plate enters a water quenching tank where the film-laminated metal plate is finally cooled to the temperature of the quenching water. This step promotes the cooling rate, thereby improving the properties of the film-laminated metal plate in use.

In step (4), the film-laminated metal plate is squeezed to rapidly remove most water remaining on the film-laminated metal plate surface, so as to make preparation for step (5).

In step (5), the film-laminated metal plate is reheated and post-treated to not only dry the film-laminated metal plate surface completely, but also adjust the inner structure of the film. In addition, the internal stress generated in the film during quenching can be eliminated, which is desirable for generation of less microcracks in the film when the film-laminated metal plate is subjected to subsequent processing, thereby improving corrosion resistance of the product. In this step, the hold time is chosen from the range of 5-40 s for the following reason: when the temperature is held for a period of time in this range, complete drying of the metal plate surface can be ensured, and the inner structure of the film can be adjusted to a certain extent, thereby eliminating the internal stress generated in the film when the film-laminated metal plate is quenched.

In the method according to the disclosure, the metal plate may be a tin plate or a chrome plate, or one of other plates.

The film-laminated metal plate produced by the method according to the disclosure can be used for food and drink packaging.

In the production method according to the disclosure, there is a time interval of 0.5-5 s after step (2) and before step (3). In other words, the film-laminated metal plate begins to be cooled very rapidly after a very short time interval. By guaranteeing this very short time interval, good corrosion resistance of the film-laminated metal plate can be achieved.

Further, in step (1) of the production method according to the disclosure, the preheating substep increases the temperature of the metal plate to 60-80% of the target temperature of the metal plate, and the soaking substep increases the temperature of the metal plate to the target temperature. In this step, 60-80% of the target temperature is chosen for the preheating for the following reason: the metal plate is heated rapidly to a temperature approaching the target temperature by preheating at first, but the metal plate does not have a very uniform temperature profile at this time; so the soaking part is carried out to realize a uniform temperature profile at various points in the metal plate and achieve the target temperature value finally.

Further, in the production method according to the disclosure, the water spray cooling in step (3) is carried out at a cooling rate ≥150° C./s.

In the above technical solution, when the cooling rate of the water spray cooling is controlled to be ≥150° C./s, the surface temperature of the film-laminated metal plate can be cooled very rapidly to 50° C. or less.

Further, in the production method according to the disclosure, the air cooling in step (5) is carried out at a cooling rate ≥80° C./s. The air cooling is typically achieved by means of air knives. The cooling rate is chosen from this range for the following reason: the metal plate is cooled rapidly to room temperature.

Further, in the production method according to the disclosure, when the angle α is greater than 5 degrees in step (2), α:β is 1:3-1:8. The reason is that the desired melt layer thickness can be obtained easily only when α:β is maintained in a certain range.

Another object of the disclosure is to provide an apparatus for producing a film-laminated metal plate using the above method for producing a film-laminated metal plate.

To fulfill the above object, the disclosure proposes an apparatus for producing a film-laminated metal plate, comprising the following components arranged in a direction for conveying a metal plate:

an induction heating device for preheating and soaking the metal plate;

a deflector roll configured to be movable in a horizontal direction to adjust an angle α between the metal plate and a vertical direction;

a film-guide roll for guiding a film into a roll gap between film-laminating rolls and adjusting an angle β, wherein the film enters the roll gap between the film-laminating rolls at said angle β;

film-laminating rolls for hot laminating the film on the metal plate;

a cooling device for cooling a film-laminated metal plate;

squeezing rolls for squeezing the film-laminated metal plate to dry;

a reheating device for reheating the film-laminated metal plate;

an air cooling device for air cooling the film-laminated metal plate after reheating.

The apparatus for producing a film-laminated metal plate according to the disclosure is used to produce a metal plate having a film laminated on a surface thereof based on the method for producing a film-laminated metal plate according to the disclosure.

The design of the deflector roll allows for easy control of a thickness of a melt layer in a film of a film-laminated metal plate, and allows for control of differentiated thicknesses of melt layers in films on two surfaces of a film-laminated metal plate. This is quite desirable for differentiated control of properties of the two surfaces of the film-laminated metal plate.

Further, the production apparatus according to the disclosure also comprises cooling rolls configured in correspondence to the film-laminating rolls, wherein the cooling rolls contact the film-laminating rolls to control the temperature of the film-laminating rolls.

Further, in the production apparatus according to the disclosure, the induction heating device comprises an induction heater and a number of induction heating rolls arranged sequentially in a direction for conveying the metal plate.

In the above technical solution, the induction heater preheats the metal plate firstly to increase a temperature of the metal plate to 60-80% of a target temperature; then, a minor increase of the temperature and soaking of the metal plate are achieved by the number of induction heating rolls. Finally, the temperature of the metal plate arrives at the target temperature, and a uniform transverse and longitudinal temperature distribution of the metal plate is achieved. Heating by a combination of the induction heater and the induction heating rolls allows for quick adjustment of the metal plate temperature, and a uniform temperature across the steel strip is ensured. This technical solution obviates the use of a conventional hot air oven or an oil roll for heating the metal plate, and a shortened length may be designed for the machine set. In addition, no need to use a fuel gas or an oil medium also allows for a heating manner which is cleaner and more environmentally friendly.

Further, in the production apparatus according to the disclosure, the cooling device comprises:

water spray beams, wherein at least two parallel water spray beams are arranged in a corresponding manner at each side of the film-laminated metal plate; nozzles are arranged on each water spray beam; and the nozzles on the at least two water spray beams are arranged in a staggering manner;

a water quenching tank, wherein the film-laminated metal plate is water quenched in the water quenching tank.

In the above technical solution, an effect of rapid, uniform cooling is achieved by the water spray cooling with the water spray beams having the above structure, and the film-laminated metal plate is finally cooled to the temperature of the quenching water by the water quenching in the water quenching tank.

Still further, in the above production apparatus, the water spray beams are coupled to a driving mechanism which drives the water spray beams to move in a direction for conveying the metal plate.

In the above technical solution, the water spray beams are positioned by the driving mechanism in the direction for conveying the metal plate, in light of the desired range of the cooling time and the conveying speed of the metal plate, so as to ensure that the surface temperature of the film-laminated metal plate is cooled rapidly to 50° C. or less after an interval time prior to the cooling.

Further, in the production apparatus according to the disclosure, the reheating device comprises a hot air oven.

In the above technical solution, the water film remaining on the surface of the film-laminated metal plate is dried off completely using the hot air oven. However, unlike common drying treatment, the film-laminated metal plate is heated in the hot air oven to a temperature above the glass transition temperature of the film that is laminated, and held for 5-40 s.

Further, in the production apparatus according to the disclosure, the air cooling device comprises air knives.

The method for producing a film-laminated metal plate according to the disclosure has the following advantages and beneficial effects:

(1) This method may be used to produce a film-laminated metal plate having differentiated melt layer thicknesses on two sides, and this differentiation is suitable for applications having different requirements of surface properties at two sides, such as food cans.

(2) The use of a combined heating process prior to film lamination helps increase the speed for heating the metal plate and improve temperature uniformity, and allows for production of a film-laminated metal plate at a relatively low heating temperature. Such a design is desirable for saving electric energy.

(3) The design of short-time rapid cooling after lamination and the process of reheating treatment after cooling may impart an ideal film structure to the film-laminated metal plate, thereby improving the formability and corrosion resistance of the film-laminated metal plate.

(4) When this method is used to produce a film-laminated metal plate, the production process favors energy conservation and environment protection, and enjoys a wide process window. Moreover, the products suit more packaging applications. For example, this method may be used to produce a novel metallic packaging material having a polyester film laminated on a surface thereof, suitable for packaging foods or drinks. When used for food packaging, this material is not only safer, but also more environmentally friendly and energy saving in its production. Thus, favorable economic and social benefits are yielded.

The apparatus for producing a film-laminated metal plate according to the disclosure is able to produce a film-laminated metal plate with the above method for producing a film-laminated metal plate. Therefore, the apparatus also has the above advantages and beneficial effects.

DETAILED DESCRIPTION

The method and apparatus for producing a film-laminated metal plate according to the disclosure will be further explained and illustrated with reference to the accompanying drawings of the specification and the specific examples. Nonetheless, the explanation and illustration are not intended to unduly limit the technical solution of the disclosure.

Figure 1:
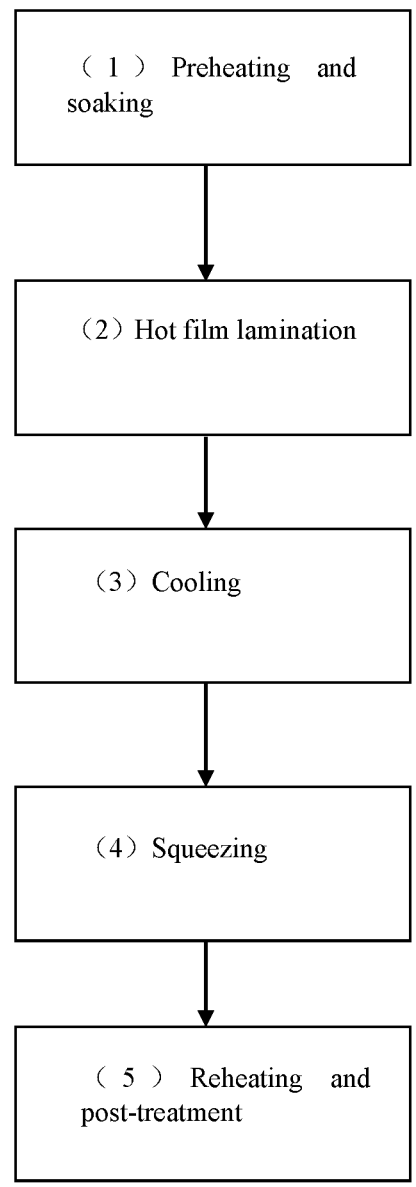
FIG. 1 is a flow chart showing schematically a method for producing a film-laminated metal plate according to the disclosure.

FIG. 1 shows schematically a flow chart of a method for producing a film-laminated metal plate according to the disclosure.

As shown by FIG. 1, the flow of a method for producing a film-laminated metal plate according to the disclosure comprises the following steps:

(1) A metal plate is preheated and soaked, wherein the preheating substep increases a temperature of the metal plate to 60-80% of a target temperature of the metal plate, and the soaking substep increases the temperature of the metal plate to the target temperature.

(2) Hot film lamination: an angle β is controlled at 30-70° at which angle α thin film enters a roll gap between film-laminating rolls, wherein said angle β is an angle between the thin film and a vertical direction; an angle α between the metal plate and the vertical direction is controlled at 0-20°; and then the film is heat-laminated on the metal plate using the film-laminating rolls. In some embodiments, when the angle α is greater than 5 degrees, α:β is 1:3-1:8. In some other embodiments, the temperature of the film-laminating rolls is controlled at 50-130° C.

(3) After the film lamination, an interval time of 0.5-5 s passes and then the metal plate begins to be cooled: the surface temperature of the film-laminated metal plate is decreased rapidly to 50° C. or less by spraying water, and then the film-laminated metal plate is water quenched in a water quenching tank. In some embodiments, the cooling rate of the water spray cooling is ≥150° C./s.

(4) The film-laminated metal plate is squeezed to remove most water from the surface of the film-laminated metal plate.

(5) Reheating and post-treatment: the film-laminated metal plate is heated to a temperature in the range of 50-130° C., held for 5-40 s, and then air cooled to room temperature quickly. In some embodiments, the cooling rate of the air cooling is ≥80° C./s.

The above metal plate may be a tin plate or chrome plate, and it can also be an aluminum plate, etc.

Examples 1-9 and Comparative Examples 1-3

The film-laminated metal plates of the abovementioned Examples and Comparative Examples were obtained using the above steps. A thickness of 25 μm was chosen for the film. A chrome plate having a thickness of 0.2 mm was chosen for the metal plates.

Table 1 lists the specific process parameters of the manufacturing method in the Examples and Comparative Examples.

TABLE 1

| | Step (1) Proportion based on target temperature (%) | Step (2) | | | | Step (3) | | | Step (5) | | |
|---|---|---|---|---|---|---|---|---|---|---|---|
| | | β (°) | α (°) | α:β | Film-laminating roll temperature (° C.) | Temperature to cool to (° C.) | Interval time (s) | Cooling rate (° C./s) | Temperature to heat to (° C.) | Soaking time (s) | Cooling rate (° C./s) |
| Ex. 1 | 70% | 60 | 15 | 1:4 | 125 | 45 | 1 | 180 | 55 | 10 | 90 |
| Ex. 2 | 80% | 60 | 15 | 1:4 | 125 | 32 | 3 | 220 | 100 | 20 | 100 |
| Ex. 3 | 70% | 60 | 15 | 1:4 | 125 | 49 | 5 | 150 | 60 | 5 | 80 |
| Ex. 4 | 60% | 50 | 10 | 1:5 | 96 | 38 | 1 | 190 | 80 | 20 | 110 |
| Ex. 5 | 70% | 50 | 10 | 1:5 | 96 | 40 | 3 | 180 | 120 | 10 | 90 |
| Ex. 6 | 80% | 50 | 10 | 1:5 | 96 | 41 | 5 | 160 | 100 | 30 | 120 |
| Ex. 7 | 80% | 40 | 5 | 1:8 | 73 | 36 | 1 | 200 | 85 | 10 | 80 |
| Ex. 8 | 70% | 40 | 5 | 1:8 | 73 | 44 | 3 | 160 | 110 | 5 | 80 |
| Ex. 9 | 70% | 40 | 5 | 1:8 | 73 | 33 | 5 | 220 | 60 | 40 | 120 |

TABLE 1-continued

|  | Step (1) Proportion based on target temperature (%) | Step (2) | | | | Step (3) | | | Step (5) | | |
| --- | --- | --- | --- | --- | --- | --- | --- | --- | --- | --- | --- |
|  |  | β (°) | α (°) | α:β | Film-laminating roll temperature (° C.) | Temperature to cool to (° C.) | Interval time (s) | Cooling rate (° C./s) | Temperature to heat to (° C.) | Soaking time (s) | Cooling rate (° C./s) |
| Comp. Ex. 1 | 70% | 40 | 0 | 0 | 60 | 39 | 5 | 180 | 80 | 30 | 120 |
| Comp. Ex. 2 | 70% | 40 | 0 | 0 | 60 | 50 | 7 | 150 | 120 | 20 | 110 |
| Comp. Ex. 3 | 80% | 40 | 0 | 0 | 60 | 43 | 10 | 190 | 60 | 10 | 90 |

The film-laminated metal plates of the above Examples and Comparative Examples were sampled to measure the melt layer thicknesses of the films on two sides (side A and side B) of the film-laminated metal plates, and measure the adhesion property and corrosion resistance of the films on side B of the film-laminated metal plates. The relevant data are listed in Table 2.

TABLE 2

| No. | Melt layer thickness of the film on side A (μm) | Melt layer thickness of the film on side B (μm) | Adhesion property of the film | Acid resistance |
| --- | --- | --- | --- | --- |
| Ex. 1 | 13 | 5 | ⊚ | ○ |
| Ex. 2 | 13 | 5 | ⊚ | ○ |
| Ex. 3 | 13 | 5 | ⊚ | ○ |
| Ex. 4 | 9.5 | 5 | ⊚ | ⊚ |
| Ex. 5 | 9.5 | 5 | ⊚ | ○ |
| Ex. 6 | 9.5 | 5 | ⊚ | ○ |
| Ex. 7 | 7 | 5 | ⊚ | ⊚ |
| Ex. 8 | 7 | 5 | ⊚ | ⊚ |
| Ex. 9 | 7 | 5 | ⊚ | ○ |
| Comp. Ex. 1 | 5 | 5 | ○ | ○ |
| Comp. Ex. 2 | 5 | 5 | ○ | ○ |
| Comp. Ex. 3 | 5 | 5 | ○ | Δ |

Note:
X—poor;
Δ—acceptable;
○—good;
⊚—very good.

The abovementioned adhesion property and acid resistance of the films were measured according to the following methods:

Method for testing the adhesion property of the films: a crosshatch tape pull test was used to evaluate the adhesion property of the films in the film-laminated metal plates. A film-laminated metal plate sample was cut into 150 mm*150 mm in size. A scriber was used to scribe 10 parallel lines horizontally and vertically respectively in the central part of a sample. The two sets of parallel lines intersected each other, and each two adjacent parallel lines were spaced by a distance of 1 mm. As such, 150 small squares of the same size were formed from these two sets of parallel lines. Then, a specialized adhesive tape was intimately adhered to the scribed zone. The tape was peeled off by gripping an end of the tape and pulling rapidly in an inclined upward direction. The degree to which the film was released was observed to evaluate the adhesive power of the film.

Method for testing acid resistance: evaluation of acid resistance was utilized to represent evaluation of corrosion resistance. A film-laminated metal plate sample was immersed in a 1.5% citric acid solution, and boiled at 121° C. for 30 min. After cooling, the sample was taken out, and spots corroded by the acid on the surface of the sample were observed to evaluate the corrosion resistance of the film-laminated metal plate.

As shown by Table 2, the melt layer thickness of the film on side A was larger than the melt layer thickness of the film on side B for each of the film-laminated metal plates of Examples 1-9; and the melt layer thickness of the film on side A was equivalent to the melt layer thickness of the film on side B for each of the film-laminated metal plates of Comparative Examples 1-3. With reference to Table 1, this suggests that the melt layer thickness of the film on side A is influenced by angle α. The adhesion power of the films in Examples 1-9 reached "very good", and the corrosion resistance property of Examples 4, and 7-8 reached "very good". The corrosion resistance property of Comparative Example 3 was "acceptable".

Figure 2:
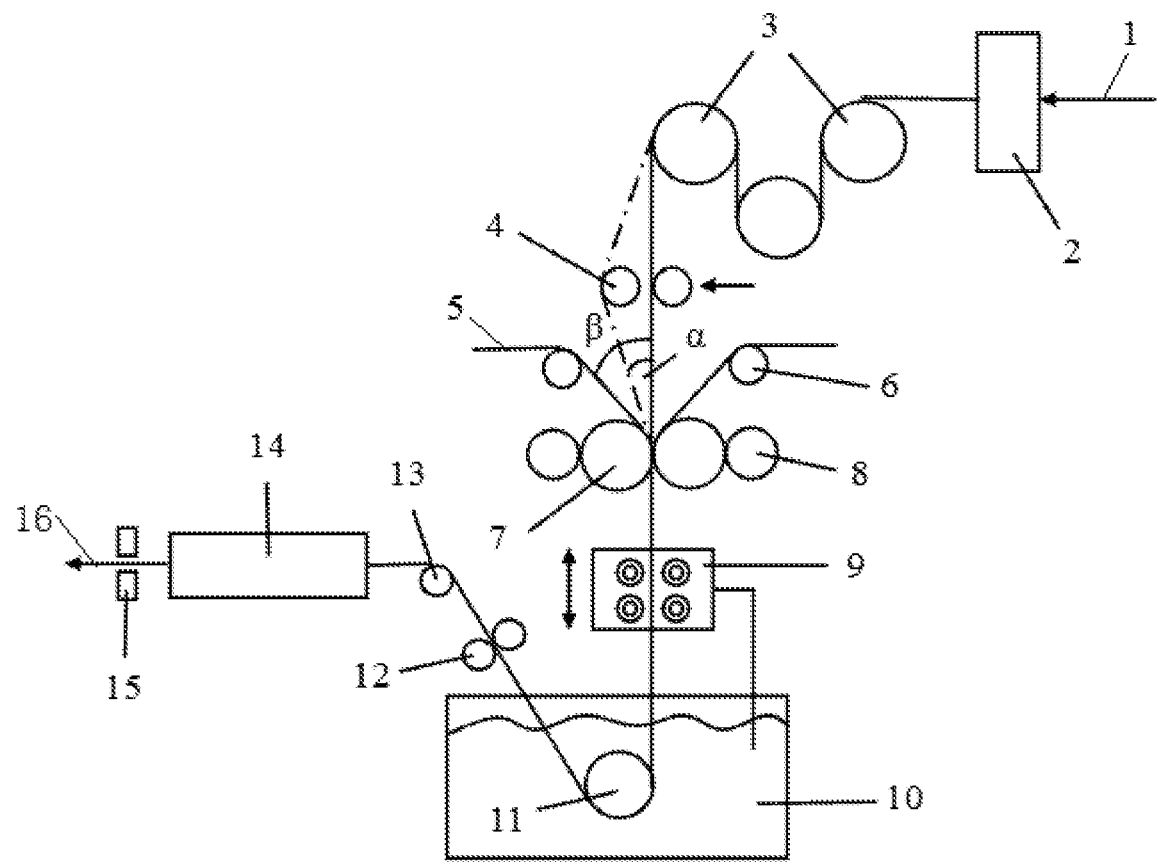
FIG. 2 is a schematic view showing a structure of an apparatus for producing a film-laminated metal plate according to an embodiment of the disclosure.

FIG. 2 shows schematically a structure of an apparatus for producing a film-laminated metal plate according to an embodiment of the disclosure.

As shown by FIG. 2, the apparatus for producing a film-laminated metal plate according to the embodiment comprises:

an induction heating device arranged in a direction along which a metal plate 1 is conveyed, and configured to preheat and soak the metal plate 1, wherein the induction heating device comprises an induction heater 2 and three induction heating rolls 3 arranged sequentially in the direction along which the metal plate 1 is conveyed; a deflector roll 4 configured to be movable in a horizontal direction to adjust an angle α between the metal plate 1 and a vertical direction; two film guide rolls 6 arranged at side A and side B of the metal plate 1 respectively, and configured to guide a film 5 into a roll gap between film-laminating rolls 7 to be described hereafter, and adjust an angle β at which the film 5 enters the roll gap between the film-laminating rolls; two film-laminating rolls configured to hot laminate the film 5 on the metal plate 1; two cooling rolls 8 arranged in correspondence to the two film-laminating rolls 7, wherein the cooling rolls 8 contact the film-laminating rolls 7 to control the temperature of the film-laminating rolls 7; a cooling device configured to cool the film-laminated metal plate 16, wherein the cooling device comprises water spray beams 9 and a water quenching tank 10, wherein an immersed roll 11 is arranged in the water quenching tank 10; two squeezing rolls 12 configured to squeeze the film-laminated metal plate to dry; a turning roll 13 configured to direct the film-laminated metal plate 16 to a reheating device 14 to be described hereafter; the reheating device 14 configured to reheat the film-laminated metal plate 16, wherein the reheating device 14 comprises a hot air oven; an air cooling device 15 configured to air cool the reheated film-laminated metal plate 16, wherein the air cooling device 15 comprises air knives. Particularly, four pairs of air knives for cooling are intimately arranged side by side in the direction for conveying the metal plate.

In the above technical solution, after the metal plate 1 leaves the induction heating rolls 3 and before it enters the film-laminating rolls 7, the temperature of the metal plate 1 will decrease to some extent. In particular, temperature drops more quickly at two side portions of the metal plate 1. As a result, the temperature does not distribute uniformly across the width of the metal plate 1. Therefore, the deflector roll 4 is designed to be able to subject the side portions to reinforced heating to make up the temperature difference between the side portions and the central portion of the metal plate 1, so as to guarantee temperature uniformity across the width of the metal strip before the metal plate 1 enters the film-laminating rolls 7.

Figure 3:
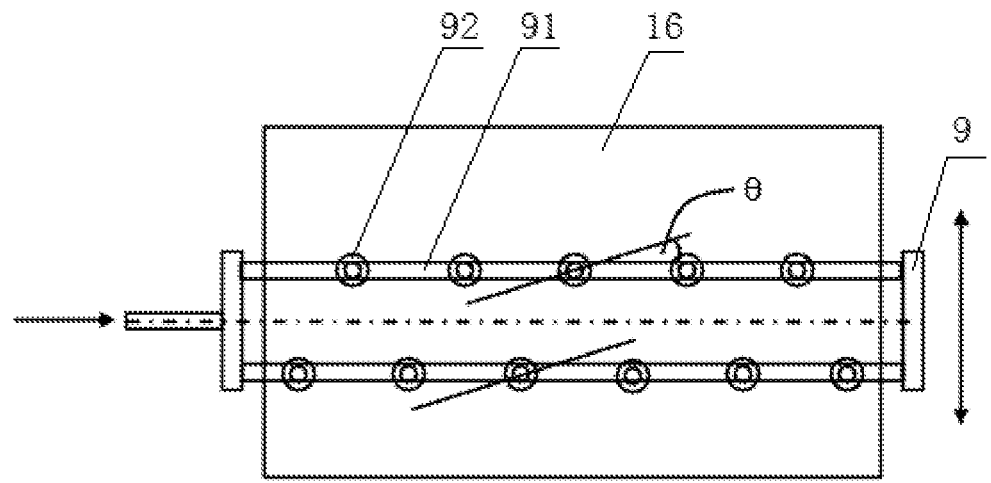
FIG. 3 is a schematic view showing a structure of a cooling device in an apparatus for producing a film-laminated metal plate according to an embodiment of the disclosure.

FIG. 3 shows schematically a structure of a cooling device in an apparatus for producing a film-laminated metal plate according to an embodiment of the disclosure.

As shown by FIG. 3, the cooling device 9 comprises: water spray beams 91, wherein two parallel water spray beams 91 are arranged in a corresponding manner at each side of the film-laminated metal plate 16, nozzles 92 are arranged on each water spray beam 91, and the nozzles 92 on the two water spray beams 91 are arranged in a staggering manner; a water quenching tank 10, wherein the film-laminated metal plate 16 is water quenched in the water quenching tank 10. 8-30 nozzles 92 are designed on each of the water spray beams 91 (the number indicated in the figure is only illustrative). The nozzles 92 are fan-type nozzles, and water sprayed therefrom has a sector-like distribution. The angle between the sector and the horizontal plane is between 10-20 degrees. In addition, the water spray beams 91 are coupled to a driving mechanism which drives the water spray beams 91 to move in the direction alone which the film-laminated metal plate 16 is conveyed, such that the water spray beams can be positioned by the driving mechanism in the direction for conveying the metal plate, in light of the desired range of the cooling time (e.g. 0.5-5 s) and the conveying speed of the metal plate, so as to ensure that the surface temperature of the film-laminated metal plate is cooled rapidly to a temperature equal to or less than the glass transition temperature of the film (e.g. a polyester film) in a period of cooling time within the desired range.

Operation of the above apparatus for producing a film-laminated metal plate comprises the following steps:

(1) The metal plate 1 is first preheated by the induction heater 2 to 60-80% of the target temperature of the metal plate, and then soaked by the induction heating rolls 3 to the target temperature.

(2) The metal plate 1 is conveyed downward vertically, deflected by the deflector roll 4 toward side A to an angle α, and enters the film-laminating rolls 7. Meanwhile, due to the action of the film guide rolls 6, the films 5 form an angle β with the metal plate 1 at both side A and side B, and enter the film-laminating rolls 7, so that hot lamination of the films is finished, and the film-laminated metal plate 16 is formed primarily. At the same time, the cooling rolls 8 contact the film-laminating rolls 7 to control the temperature of the film-laminating rolls 7.

(3) The film-laminated metal plate 16 is further conveyed downward vertically, firstly cooled by water sprayed from the water spray beams 9 to rapidly decrease the surface temperature of the film-laminated metal plate 16 to a temperature equal to or less than the glass transition temperature of the films, and then water quenched by means of the immersed roll 11 in the water quenching tank 10.

(4) The film-laminated metal plate 16 is squeezed by the squeezing rolls 12 to dry.

(5) The film-laminated metal plate 16 is guided by the turning roll 13 into the reheating device 14 to heat the film-laminated metal plate 16 to a temperature equal to or higher than the glass transition temperature of the films, held, and then air cooled rapidly to room temperature.

It is to be noted that there are listed above only specific examples of the invention. Obviously, the invention is not limited to the above examples. Instead, there exist many similar variations. All variations derived or envisioned directly from the disclosure of the invention by those skilled in the art should be all included in the protection scope of the invention.

What is claimed is:

1. A production method for a film-laminated metal plate, comprising:
(1) preheating and soaking a metal plate;
(2) laminating a film on the metal plate using film-laminating rolls, comprising controlling an angle β to be in a range of 30-70°, wherein said angle β is an angle between the film and a vertical direction, and the film enters a roll gap between film-laminating rolls at said angle β; controlling an angle α to be in a range of >0 to 20° with a deflector roll configured to be movable in a horizontal direction to adjust the angle α between the metal plate and a vertical direction, wherein the metal plate enters the roll gap at said angle α; and then laminating the film on the metal plate using the film-laminating rolls, while controlling a temperature of the film-laminating rolls to be in a range of 50-130° C.;
(3) cooling a surface of a resulting film-laminated metal plate rapidly to a temperature equal to or less than 50° C. at first by water spray cooling, followed by water quenching in a water quenching tank;
(4) squeezing the film-laminated metal plate to remove most water from the surface of the film-laminated metal plate; and
(5) heating the film-laminated metal plate to a temperature in the range of 50-130° C., holding for 5-40 s, and then air cooling the film-laminated metal plate to room temperature quickly.

2. The production method according to claim 1, wherein there is a time interval of 0.5-5 s after step (2) and before step (3).

3. The production method according to claim 1, wherein in step (1), the preheating increases a temperature of the metal plate to 60-80% of a target temperature of the metal plate, and the soaking increases the temperature of the metal plate to the target temperature.

4. The production method according to claim 1, wherein the water spray cooling in step (3) is carried out at a cooling rate ≥150° C./s.

5. The production method according to claim 1, wherein the air cooling in step (5) is carried out at a cooling rate ≥80° C./s.

6. The production method according to claim 1, wherein α:β is 1:3-1:8 when the angle α is greater than 5 degrees in step (2).

* * * * *